E. H. HEBERN.
TURNING SIGNAL FOR AUTOMOBILES.
APPLICATION FILED FEB. 21, 1920.
1,397,211.
Patented Nov. 15, 1921.
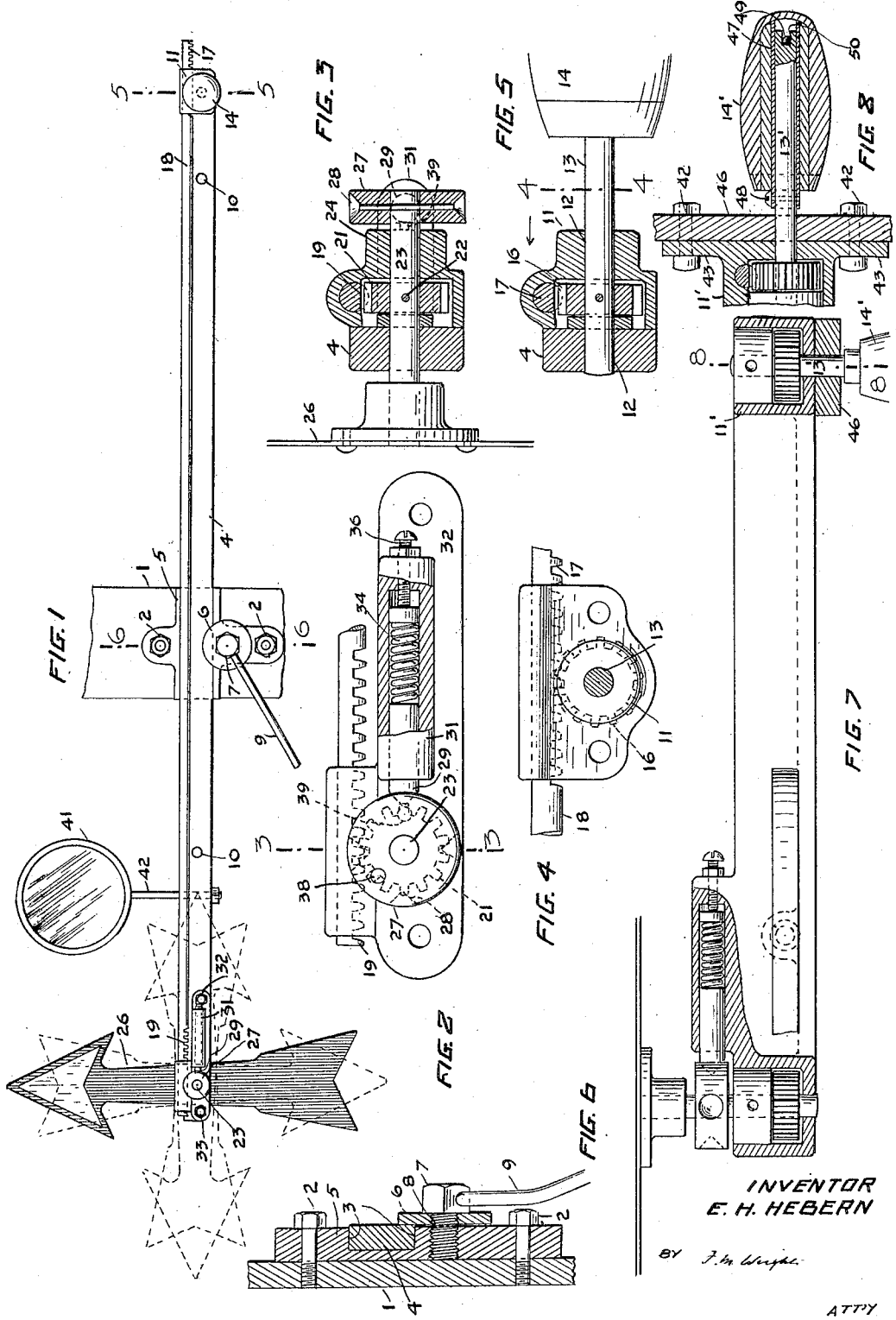
INVENTOR
E. H. HEBERN
BY
ATT'Y

UNITED STATES PATENT OFFICE.

EDWARD H. HEBERN, OF OAKLAND, CALIFORNIA, ASSIGNOR TO H. & H. PATENT DEVELOPING COMPANY, OF OAKLAND, CALIFORNIA, A CORPORATION OF CALIFORNIA.

TURNING-SIGNAL FOR AUTOMOBILES.

1,397,211.   Specification of Letters Patent.   Patented Nov. 15, 1921.

Application filed February 21, 1920. Serial No. 360,475.

*To all whom it may concern:*

Be it known that I, EDWARD H. HEBERN, a citizen of the United States, residing at Oakland, in the county of Alameda and State of California, have invented new and useful Improvements in Turning-Signals for Automobiles, of which the following is a specification.

The present invention relates to improved means for indicating the direction in which a vehicle is about to travel, or when it is about to stop.

In the accompanying drawing, Figure 1 is a rear view of my improved means, shown as attached to a portion of a vehicle; Fig. 2 is a detail broken rear view of a portion of said means; Fig. 3 is a vertical section of the same on the line 3—3 of Fig. 2; Fig. 4 is a vertical section of the same on the line 4—4 of Fig. 5; Fig. 5 is a broken section on the line 5—5 of Fig. 1; Fig. 6 is a vertical section on the line 6—6 of Fig. 1; Fig. 7 is a broken plan view of a modified form of the invention; Fig. 8 is a sectional view on the line 8—8 of Fig. 7.

Referring to the drawing, 1 indicates an upright member of a wind shield, to which is bolted, as shown at 2, a guideway 5 in a groove 3 of which can slide a horizontal bar 4 extending partly within and partly outside the car. Said bar is secured in any desired position by the pressure of a washer 6 pressed against said bar by the head 7 of a screw 8 screwed into the lower portion of the guideway 5 by a handle 9. Secured to the bar 4 at its inner end is a housing 11 and in registering holes 12 in said bar and housing is contained a stem 13, projecting rearwardly from the housing and provided at its rear end with a handle 14. Within the housing, said bar is secured to a pinion 16 which engages a rack 17 formed on the upper side of the inner end of a stem 18. A similar rack 19 is formed on the outer end of said stem and engages a pinion 21 secured, as shown at 22, to a shaft 23 having its bearing in the outer end of the bar 4 and in a housing 24 secured to said bar. The front end of said shaft 23 carries a signaling device 26, such as an arrow, and the rear end of said shaft 23, projecting rearwardly from the housing 24, carries a wheel 27. Engaging recesses 28 in the edge of said wheel is a pin 29 which slides outwardly through an end of a holder 31 on a plate 32 secured by screws 33 to the bar 4, said pin being normally pressed outwardly by a spring 34, the pressure of said spring being adjusted by a screw 36 screwed through the rear end of the spring housing 31. A pin 38 extending forwardly from said wheel 27 engages a pin 39 extending rearwardly from the housing 24 and arrests the movement of the arrow when said arrow points inwardly when the pin 38 is either above or below the pin 39.

A mirror 41 is carried by an upright 42 secured at the horizontal bar 4.

In the form of the invention shown in Figs. 6 and 7, the device is adapted for use with a closed car.

In this case, there is provided a housing 11' having upward and downward extensions 43, which are bolted, as shown at 42, to the casing 46 of the car. The shaft 13' extends through said housing and is provided at its rear end with a handle 14'. Said handle is shrunk on to the sleeve 47, which is attached by a screw 48 to the stem 13', a pin 49 extending through said tube and handle engaging the forked rear end 50 of the shaft 13'.

I claim:—

In an indicating signal for vehicles, the combination of a bearing in a vehicle, a bar longitudinally held adjustably in the bearing, one end of the bar being within the vehicle and the other end being outside the vehicle, a signal carried on the outer end of the bar, means at the inner end of the bar for turning the signal, and an operative connection between said turning means and signal whereby the signal is turned about a horizontal axis when said turning means is operated.

EDWARD H. HEBERN.